G. H. HERMANN.
AIR MOISTENING DEVICE FOR FURNACES OR THE LIKE.
APPLICATION FILED FEB. 16, 1914.
1,119,598.
Patented Dec. 1, 1914.
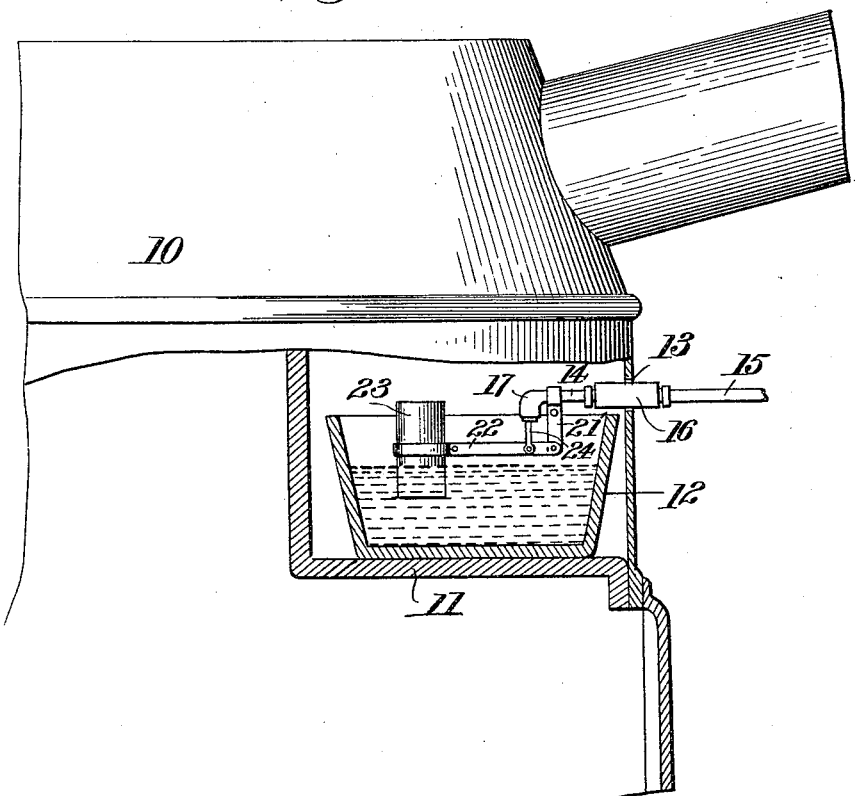
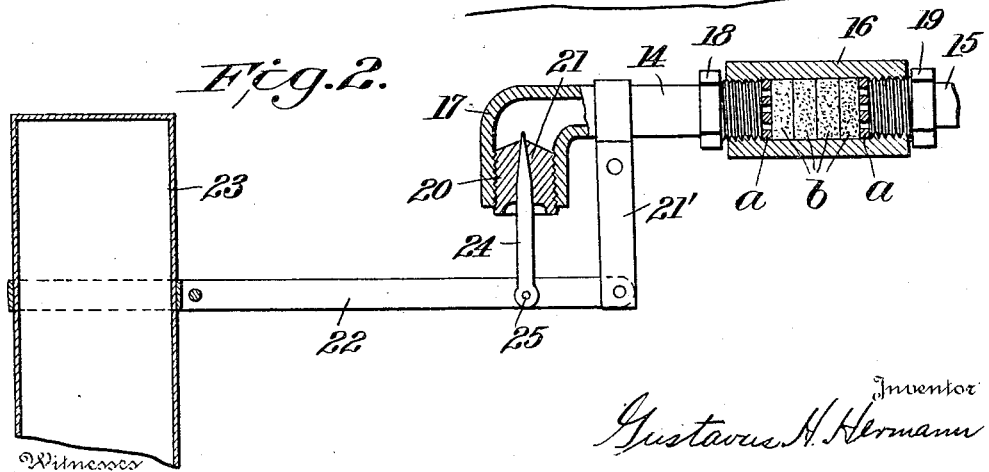

UNITED STATES PATENT OFFICE.

GUSTAVUS H. HERMANN, OF MINNEAPOLIS, MINNESOTA.

AIR-MOISTENING DEVICE FOR FURNACES OR THE LIKE.

1,119,598. Specification of Letters Patent. Patented Dec. 1, 1914.

Application filed February 16, 1914. Serial No. 819,029.

*To all whom it may concern:*

Be it known that I, GUSTAVUS H. HERMANN, a citizen of the United States, residing at Minneapolis, in the county of Hennepin and State of Minnesota, have invented certain new and useful Improvements in Air-Moistening Devices for Furnaces or the like, of which the following is a specification.

This invention relates to air moistening devices.

There are comparatively few hot air furnace users who realize the importance of supplying moisture to the heated air. Therefore, the majority of furnaces are more or less neglected by failure to supply water to the same to moisten the air. The result is injury to health, destruction to furniture, and the efficiency of the heating plant is greatly reduced.

It is therefore one object of my invention to moisture the air and to supply the water automatically from city water mains or other sources in such a manner that there will be maintained a constant supply of water, thereby obviating the necessity of care or attention on the part of the housekeeper or other person and insuring moisture laden air being circulated through the rooms of a dwelling or other place from a hot air furnace or the like.

Another object is to provide a device of the nature stated embodying among other characteristics means whereby, incident to evaporation the water in the pan tends to lower, the pan may be replenished drop by drop if necessary with the result that the water is delivered to the pan at the same temperature as the inside of the casing and a constant level maintained without sudden heavy flows of cold water, which would retard evaporation until the water became heated, the pan thereby never becoming dry nor overflowing.

A still further object is to provide an air moistening device embodying a pan and means to supply water thereto automatically from city or town mains or other sources, irrespective of high or low pressure and deliver water to the pan just as fast as it is evaporated without danger of the pan overflowing or the water lowering beyond a certain level.

With the above and other objects in view, the present invention consists in the combination and arrangement of parts hereinafter more fully described, illustrated in the accompanying drawings, and particularly pointed out in the appended claim, it being understood that changes may be made in the form, proportion, size and minor details without departing from the spirit or sacrificing any of the advantages of the invention.

In the drawings: Figure 1 is a fragmentary view of a hot air furnace partly in section, illustrating my invention. Fig. 2 is a side elevation partly in section illustrating my invention on an enlarged scale disconnected from the furnace.

Referring now more particularly to the accompanying drawings, the reference character 10 indicates a shell of a hot air or other furnace or the like in which is mounted in any suitable manner a shelf or other suitable supporting means 11 upon which is disposed a pan 12. The pan may be supported in any other suitable manner. The means shown is for purpose of illustration. Instead of being confined within the furnace shell, the pan may project both within and without the same. As illustrated, the shell has an opening 13 through which may extend a pipe leading from a city or town main or other source. As shown, the pipe consists of sections 14 and 15 connecting which is a strainer embodying a sleeve 16 adjacent the ends of which are disposed foraminated or perforated disks $a$ between which is disposed fabric $b$ or other suitable straining material. The section 14 is provided with an elbow 17 which is interiorly screw threaded and which extends downwardly into the pan 12. By virtue of the nuts 18 and 19 the strainer sleeve 16 of the pipe may be readily disconnected when desired. Fitted in the interiorly screw threaded portion of the elbow part 17 of the pipe section 14 is an exteriorly screw threaded bushing 20 which has an upwardly tapered bore 21. The walls of the bore come to practically a point at the inner end of the bore providing a relatively small opening at the inner end of the bushing 20. The inner end of the bushing 20 may or may not be convexed but, as shown, is convexed in the accompanying drawings. Suspended from the pipe section 14 is a bracket 21' which projects down into the pan 12 and to the lower end of which is pivoted one end of an arm 22 to the outer end of which is secured in any suitable manner a float 23 of any suitable character. A needle valve 24 is pivoted at 25 to the arm 22 preferably adjacent the inner end of the latter. The opposite end of the needle valve is tapered as shown and extends into the tapering bore 21 of the bushing 20, preferably protruding beyond the inner end of the latter.

From the foregoing it will be seen that I provide an exceedingly simple, automatic device to insure a constant level of water in the pan and thereby provide for a moistening of the air without attention on the part of the house keeper or attendant of the furnace, for as rapidly as the water may become evaporated the pan is replenished, if necessary drop by drop, according to the evaporation of the water. The slightest downward movement of the arm 22 unseats the valve and as the opening 21 at the inner end of the bushing is relatively small, there is no danger of the water spurting incident to pressure into or out of the pan. Nor is there any danger of the valve becoming stuck in its valve seat.

What is claimed is:

The combination with a furnace, of a water pan, therein, said furnace having an opening in its casing, a strainer disposed within said opening, a pipe in which said strainer is mounted, an elbow provided upon one end of said pipe and depending within the water pan, a plug threaded in the elbow and adjustable therein, said plug having an upwardly tapering valve seat therein, an arm secured to the pipe and extending below the elbow, a second arm pivoted to the lower end of the first mentioned arm and disposed within the water pan, a float attached to the second mentioned arm, and a valve pivoted to the second mentioned arm and having its upper end tapered and disposed loosely in the valve seat and controlling the flow of water from the pipe to the water pan.

In testimony whereof I affix my signature in presence of two witnesses.

GUSTAVUS H. HERMANN.

Witnesses:
I. E. BURGAN,
C. F. PRICE.